United States Patent
Jaquette

(10) Patent No.: US 7,266,636 B2
(45) Date of Patent: Sep. 4, 2007

(54) DEFERRED WRITING OF DATA TO BE SYNCHRONIZED ON MAGNETIC TAPE EMPLOYING A NON-VOLATILE STORE

(75) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/022,475

(22) Filed: Dec. 27, 2004

(65) Prior Publication Data

US 2005/0108471 A1    May 19, 2005

Related U.S. Application Data

(63) Continuation of application No. 10/336,694, filed on Jan. 6, 2003, now Pat. No. 6,839,801.

(51) Int. Cl.
   G06F 12/00    (2006.01)
   G06F 13/00    (2006.01)
(52) U.S. Cl. .................. 711/111; 711/154; 711/161
(58) Field of Classification Search .................. 711/1, 711/100, 111, 154, 161, 162
   See application file for complete search history.

(56) References Cited

U.S. PATENT DOCUMENTS

| | | | |
|---|---|---|---|
| 3,999,163 A | 12/1976 | Levy et al. | 340/172.5 |
| 4,916,605 A * | 4/1990 | Beardsley et al. | 711/162 |
| 4,983,901 A * | 1/1991 | Lehmer | 318/685 |
| 5,537,157 A | 7/1996 | Washino et al. | 348/722 |
| RE37,342 E | 8/2001 | Washino et al. | 348/722 |
| 6,360,221 B1 * | 3/2002 | Gough et al. | 707/10 |
| 2001/0034728 A1 | 10/2001 | McBride et al. | 707/1 |
| 2003/0043924 A1 | 3/2003 | Haddad et al. | 375/240.28 |

* cited by examiner

Primary Examiner—Tuan V. Thai
(74) Attorney, Agent, or Firm—John H. Holcombe

(57) ABSTRACT

Data of a transaction to be synchronized is stored to a non-volatile store, and a Command Complete response is provided. Data of the transaction is supplied to a tape drive for writing to a magnetic tape. The storing, responding, and supplying operations are repeated for subsequent transactions. A Deferred Synchronize Command, specifying a previously supplied transaction, is provided to the tape drive, for writing data of the specified transaction. The tape drive, subsequent to writing all the data of the previously supplied transaction to magnetic tape, provides a Tape Command Complete, whereupon the data of the previously supplied transaction stored to the non-volatile store may be overwritten.

6 Claims, 6 Drawing Sheets

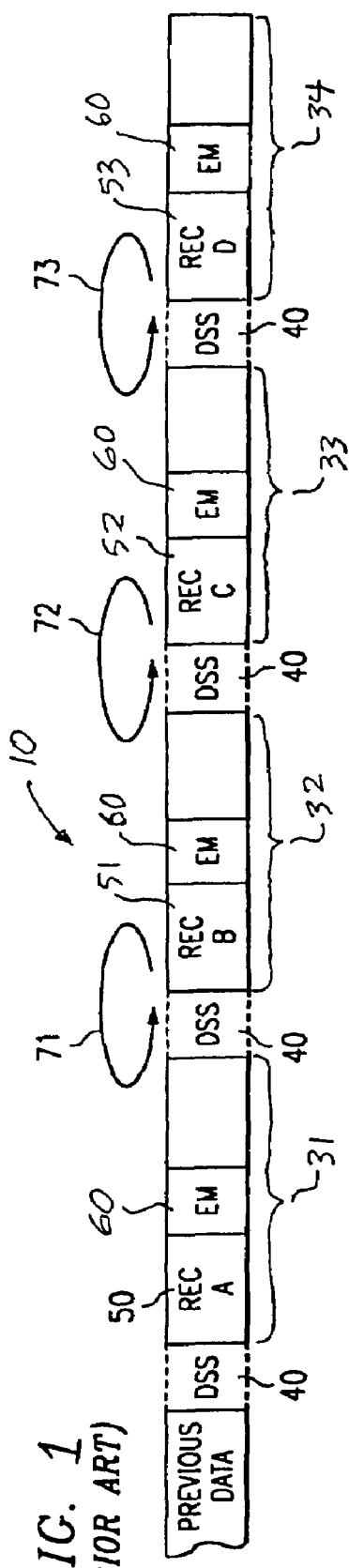
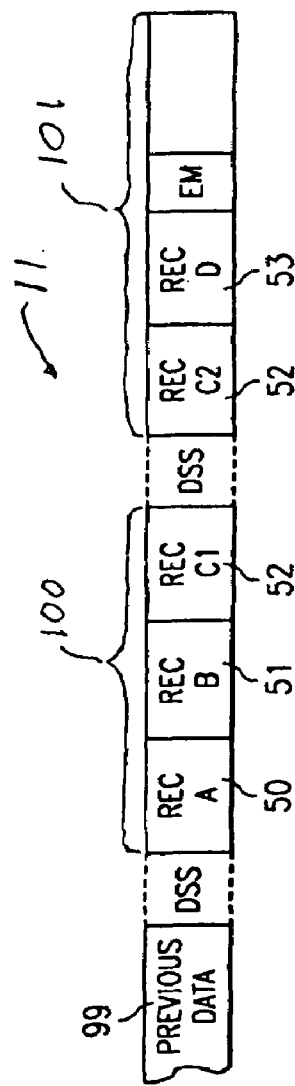
FIG. 1 (PRIOR ART)
FIG. 3

PRIOR ART

300 — Write Record A
301 — Synchronize (all data through A)
302 — -- BACKHITCH --
303 — Write Record B
304 — Synchronize (all data through B)
305 — -- BACKHITCH --
306 — Write Record C
307 — Synchronize (all data through C)
308 — -- BACKHITCH --
309 — Write Record D
Synchronize (all data through D)
-- BACKHITCH --
⋮
320 — Write Record S
321 — Write Record T
322 — Synchronize (all data through T)
323 — -- BACKHITCH --
324 — Write Record U
325 — Write Record V
Synchronize (all data through V)
-- BACKHITCH --
Write Record W
Write Record X
Synchronize (all data through X)

FIG. 8

350 — Write Record A
351 — Write Record B
352 — Write Record C
353 — Write Record D
354 — Deferred Sync of B
Write Record E
⋮
Write Record S
Write Record T
Deferred Sync of R
Write Record U
Write Record V
Deferred Sync of T
Write Record W
360 — Write Record X
Deferred Sync of V
362 — Deferred Sync of X

FIG. 9

DEFERRED WRITING OF DATA TO BE SYNCHRONIZED ON MAGNETIC TAPE EMPLOYING A NON-VOLATILE STORE

This Application is a Continuation of copending application Ser. No. 10/336,694, filed Jan. 6, 2003, now U.S. Pat. No. 6,839,801.

FIELD OF THE INVENTION

This invention relates to storage of data to magnetic tape, and, more particularly, to storage of data to be synchronized, data which is to be physically written to tape before a Tape Command Complete response can be made, so that the entity sending the data is able to erase its data, knowing that a copy physically exists on magnetic tape.

BACKGROUND OF THE INVENTION

Magnetic tape provides a means for physically storing data which may be archived or which may be stored in storage shelves of automated data storage libraries and accessed when required. Data stored in this manner has an aspect of permanence which allows copies of the data stored in memory or disk at a host system to be erased, knowing that a copy exists on involatile magnetic tape. The available storage space at the host system is relatively expensive, and there is a desire to release the storage space as soon as possible, so that it may be overwritten. Additionally, some host applications are designed with a simple algorithm, in which they do not proceed to processing data beyond the data that has been sent, until they see a Command Complete returned for the just issued store command. This simplifies the host application processing.

Thus, it is often desirable to "synchronize" the data.

"Synchronized data" is defined as data or other information which is subject to a "synchronizing event" or similar command requiring the tape drive to not return "Command Complete" to a write type of command, or an indication that the command has been or will be successfully executed, until it has actually committed the data to involatile media, specifically, in the case of a tape drive, to magnetic tape. As the result, if power is lost or the tape drive fails, the data can be recovered from the tape, whereas it may not be recoverable from a volatile DRAM storage of the tape drive buffer.

One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and all data which precedes the command must be written to tape before a command complete is sent. Hence, this command is often referred to as a "Synchronize" command, as is known to those of skill in the art.

Another example of a synchronizing event is a host selectable write mode known to those of skill in the art as "non-buffered writes", where an implicit synchronize must be performed after each record is written from the host. "Command Complete" is not returned for any write command until the data is successfully written on tape media.

Herein, writing any data record, group of records, or other mark, is defined as a "transaction", and writing such data record, etc., as the result of a synchronizing event is defined as a "synchronized transaction".

A difficulty with respect to magnetic tape is that the data is recorded sequentially without long gaps between data sets, such that the data is typically recorded in a continuous fashion as much as is possible.

Typically, the data to be written to magnetic tape is staged to a buffer at the tape drive, and the synchronizing event requires that, in writing the synchronized data to magnetic tape, all data in the buffer preceding the synchronized data also be written to tape preceding the data to be synchronized. Additionally, since no data is typically sent to the drive after the drive is sent the synchronizing command and before the Command complete is sent back (to do so would require command queueing of data commands, something which is almost never supported by a tape drive), this has the effect of emptying the buffer. Thus, the synchronized transactions are stored in separate bursts for each synchronizing event, with a noticeable time period before writing the next transaction. This requires that the tape drive "backhitch" after writing the synchronized transaction, in order to write the next transaction closely following the preceding transaction. In the example of a simplified host application as discussed above, the application does not proceed to processing data beyond data that has already been sent until it sees a Command Complete returned for the just issued synchronizing command. This simplifies the host application processing, but at the cost of performance, since it guarantees that the tape drive will run out of data in the buffer before it can issue a Command Complete, thus forcing the tape drive to backhitch. Tape is written or read while it is moved longitudinally at read/write speed. Hence, a backhitch requires that the tape be stopped, reversed to beyond the end of the previous transaction, stopped again, and accelerated up to speed in the original direction by the time that the end of the previous transaction is reached. As is understood by those of skill in the art, the backhitch process consumes a considerable amount of time, and, if a large number of small synchronized transactions are to be stored, the throughput of the tape drive can be reduced dramatically. As an example, backhitch times can vary from about half a second to over three seconds.

Disk drives are typically random access, and may store data without requiring backhitches, but are expensive as compared to magnetic tape, such as magnetic tape cartridges. Hence, disk drives are typically employed, not for the permanent storage of data, but, rather, for the storage of data which is being used by the system, or for the operating system and applications of the system.

Staging buffer systems, such as large capacity disk drive buffer systems, have been employed to provide a physical storage for the data while waiting for the data to be permanently stored to magnetic tape, but, especially in smaller system environments, staging buffer systems are considered expensive, and are avoided if possible. In the larger systems, the staging buffer systems are also considered expensive, and are typically limited in capacity, such that they need to be overwritten as soon as possible. Thus, data to be synchronized is provided to magnetic tape drives in such systems.

SUMMARY OF THE INVENTION

In accordance with the present invention, a recording system for a magnetic tape drive, sync logic, and a method are provided for writing data to be synchronized to magnetic tape.

In one embodiment, the data to be synchronized is written to magnetic tape by a magnetic tape drive. The data is in the form of transactions of data to be synchronized. The magnetic tape drive responds to a Command for writing data of an identified transaction to magnetic tape, with a Tape Command Complete subsequent to writing all data preceding and including the identified transaction to the magnetic tape. A non-volatile store is provided for storing data.

Deferred sync logic:

stores the data of a transaction to be synchronized to the non-volatile store;

upon storing all the data of the transaction to the non-volatile store, responds with a Command Complete;

supplies the data of the transaction to the magnetic tape drive for writing to the magnetic tape;

repeats the storing, responding, and supplying operations for subsequent transactions of the data to be synchronized; and provides a Deferred Synchronize Command to the magnetic tape drive, the Deferred Synchronize Command specifying at least one previously supplied transaction of data, the Deferred Synchronize Command comprising the Command for writing data of an identified transaction to magnetic tape. Thus, the magnetic tape drive writes the data in a continuous fashion, and, subsequent to writing all the data of the previously supplied transaction to magnetic tape, provides a Tape Command Complete, whereupon the data of the previously supplied transaction stored to the non-volatile store may be overwritten.

In a further embodiment, the non-volatile store is removable. Thus, in case of failure of the recording system, the removable non-volatile store is inserted in another recording system for recovery of the data. The removable non-volatile store may comprise a removable hard disk drive, or, alternatively comprise an electronic memory. Still alternatively, the non-volatile store may not be removable, but the data may be transmitted to another recording system for recovery of the data.

In another embodiment, the deferred sync logic for communicating with the magnetic tape drive and for communicating with the non-volatile store for writing data to magnetic tape, the deferred sync logic:

stores the data of a transaction to be synchronized to the non-volatile store;

upon storing all the data of the transaction to the non-volatile store, responds with a Command Complete;

supplies, possibly simultaneously to storing the data to the non-volatile store, the data of the transaction to the magnetic tape drive for writing to the magnetic tape;

repeats the storing, responding, and supplying operations for subsequent transactions of the data to be synchronized; and upon storing a predetermined quantity of the data of the transactions to the non-volatile store, provides a Deferred Synchronize Command to the magnetic tape drive. The Deferred Synchronize Command specifies at least one previously supplied transaction of data, the Deferred Synchronize Command comprising the Command for writing data of an identified transaction to tape, such that the magnetic tape drive, subsequent to writing all the data of the specified previously supplied transaction to the magnetic tape, and writing data of transactions prior to the specified previously supplied transaction to the magnetic tape, provides a Tape Command Complete, whereupon the data of the specified previously supplied transaction, and the data of transactions prior to the specified previously supplied transaction, may be overwritten at the non-volatile store.

In still another embodiment, the non-volatile store comprises at least two partitions for storing data, and the stored predetermined quantity of data of the transactions comprises data stored to one of the partitions of the non-volatile store. After storing the predetermined quantity of data of the transactions to the one partition of the non-volatile store, the deferred sync logic stores data of a later transaction to another partition of the non-volatile store; and repeats the responding, and supplying operations for the data of the later transaction.

In a further embodiment, the deferred sync logic additionally, in storing the predetermined quantity of data for the later transactions to the one partition of the non-volatile store, provides a Deferred Synchronize Command to the magnetic tape drive which specifies data of the another partition. Thus, the magnetic tape drive, subsequent to writing all the data of the specified previously supplied transaction of the another partition to the magnetic tape, and writing data of transactions prior to the specified previously supplied transaction to the magnetic tape, provides a Tape Command Complete. Hence, the data of the specified previously supplied transaction of the another partition, and the data of transactions prior to the specified previously supplied transaction, may be overwritten at the another partition of the non-volatile store. Then, the deferred sync logic conducts the storing, responding and supplying operations for the data of later transactions, with respect to the another partition of the non-volatile store.

Additionally, in another embodiment, the deferred sync logic upon failure of the storing operation to the non-volatile store, provides a Synchronize Command to the magnetic tape drive to preserve the data on magnetic tape.

For a fuller understanding of the present invention, reference should be made to the following detailed description taken in conjunction with the accompanying drawings.

BRIEF DESCRIPTION OF THE DRAWINGS

FIG. 1 is a diagrammatic illustration of synchronized data written on a magnetic tape employing the prior art methodology with backhitches;

FIG. 3 is a diagrammatic illustration of data to be synchronized written on magnetic tape employing one embodiment of the present invention;

FIG. 8 is a diagrammatic illustration of an event string for synchronizing data employing the prior art methodology;

FIG. 9 is a diagrammatic illustration of an event string for writing data to be synchronized to magnetic tape employing one embodiment of the present invention.

DETAILED DESCRIPTION OF THE INVENTION

Figure 2:
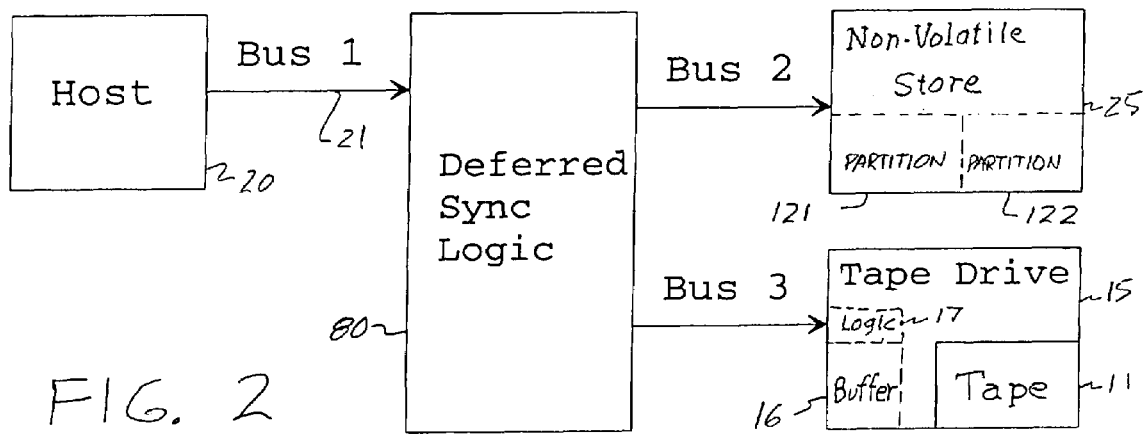
FIG. 2 is a block diagram of an embodiment of the present invention for writing data to be synchronized to magnetic tape.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

As discussed above, magnetic tape provides a means for physically storing data which may be archived or which may be stored in storage shelves of automated data storage libraries and accessed when required. Tape drives often employ a "read after write" process to insure that the data is written correctly to provide an aspect of permanence. This permanence allows copies of the data stored in memory or disk at the host system to be erased, knowing that a correct copy exists on magnetic tape.

The available storage space at the host system or at a staging buffer is relatively expensive, and there is a desire to release the storage space as soon as possible, so that it may be overwritten. Thus, it is often desirable to "synchronize" the data, requiring the tape drive to not return "Command Complete" to a write type of command, or an indication that the command has been or will be successfully executed, until it has actually committed the data to media, specifically, the magnetic tape. Once the data has been written to the magnetic tape, if power is lost or the tape drive fails, the data can be recovered from the tape, whereas it may not be recoverable from a volatile DRAM storage of the tape drive buffer.

Various examples of synchronizing events which have the effect of synchronizing the data are known to those of skill in the art. One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and the only meaning of the command is that all data which precedes the command must be written to tape before a command complete is sent. Another example is a host selected non-buffered write mode implicitly requiring a synchronize for each record.

Referring to FIG. 1, data is typically recorded on magnetic tape, such as magnetic tape 10, sequentially with only short gaps between data sets, for example between data sets 31 and 32, 32 and 33, etc. These gaps may be written with an Interblock Gap (IBG) pattern, or may comprise a Data Set Separator (DSS) pattern 40, as is known to those of skill in the art. The gap may comprise an actual unrecorded portion and a portion that is recorded. For example, the LTO format DSS comprises a tone pattern between data sets. As discussed above, the tape is written or read while motors move the tape longitudinally. Data typically comprises a string of records arranged in data sets, each with a DSS, which are written with nominal spacing. Only occasionally, typically when the buffer is empty, is the tape stopped.

However, if the data is synchronized, it must be immediately written to tape from the buffer, and only after the synchronized transaction has been written to tape is the transaction erased from the buffer and overwritten, such that it cannot be the subject of a continuous data flow. Hence, synchronized transactions instead are written immediately to the magnetic tape in separate bursts at each synchronization event. As a result, after some (possibly only one) data sets are written for a synchronized transaction, in the prior art of FIG. 1, to insure that the data sets are closely spaced, the tape is stopped after the last of these data sets. Some finite distance and finite time is required to stop the tape, and the tape is then "backhitched", reversed to beyond the end of the just written last data set, stopped again, and accelerated up to speed in the original direction by the time that the end of the just written last data set is reached, so that the DSS and the next data set may be written. As is understood by those of skill in the art, the backhitch process consumes a considerable amount of time.

Thus, if a large number of synchronized transactions are to be stored, the throughput of the tape drive is reduced dramatically. As an example, backhitch times can vary from about half a second to over three seconds each.

In the example of FIG. 1, records 50-53 of magnetic tape 10 are synchronized. Typically, a transaction will comprise hundreds of records, but transactions of only one record each are illustrated for descriptive purposes herein. If a transaction comprised of a record, or group of records, ends in the middle of a data set, then an End Marker (EM) 60 is written to signal that the remainder of that data set is empty (e.g., space between 60 and 40). Typically, each synchronized transaction is formatted as some number (may be one) of data sets, and is illustrated in FIG. 1 as data records 50-53 in data sets 31-34. Referring additionally to FIG. 8, the prior art process, at event 300, writes record 50, and synchronizing event 301 requires that the tape drive write data set 31 (to synchronize transaction record 50). Only after the writing is completed, does the tape drive provide a Command Complete, and allow the buffer to begin filling with data from the next write operation. Because the buffer is now empty, backhitch event 302 (shown by arrow 71) is required to write data set 32 of event 303 with a minimum amount of DSS pattern in between. If there were no backhitch, only relatively few records, transactions or data sets would be written to the magnetic tape due to wasted space, and the DSS pattern would occupy the bulk of the tape.

Continuing reference to FIGS. 1 and 8, synchronizing event 304 requires that the tape drive write data set 32 (to synchronize transaction record 51), and, because the buffer is now empty, backhitch event 305 (shown by arrow 72) is required to write data set 33 of event 306 with a minimum amount of DSS pattern in between. As discussed above, the backhitch operation consumes a great amount of time as compared to the time to write a data set.

Synchronizing event 307 requires that the tape drive write data set 33 (to synchronize transaction record 52), and, because the buffer is now empty, backhitch event 308 (shown by arrow 73) is required to write data set 34 of event 309 with a minimum amount of DSS pattern in between, etc. The process continues until all of the synchronized data has been written.

As discussed above, if a large number of small synchronized transactions are to be stored, the backhitches reduce the throughput of the tape drive dramatically. As an example, backhitch times can vary from about half a second to over three seconds.

One approach is to increase the amount of data for a synchronizing event, which, for example, is made by changing the program that originates the synchronization command to allow more data to be included in a transaction, or by limiting the synchronization command to multiple write transactions. This approach is illustrated in FIG. 8, beginning at write event 320. In the example, write events 320 and 321 allow two transactions to be provided to the tape drive before the synchronizing command of event 322.

However, as before, the synchronizing event 322 requires that the tape drive complete writing the data sets of transactions 320 and 321 and to empty the buffer. Only after the writing is completed does the tape drive provide a Command Complete, and allow the buffer to refill with the data for the next write operation. Again, because the buffer is now empty, backhitch event 323 (shown by arrow 71 of FIG. 1) is required in order to write the data sets of the next write events 324 and 325 with a minimum amount of DSS pattern in between the data sets written at events 321 and 324. As before, the process continues until all of the synchronized data has been written. The above approach, for the same amount of data, reduces the number of backhitches and thereby increases the throughput, but the throughput for a large number of synchronized records is still low as compared to non-synchronized data. However, as discussed above, the purpose of the synchronization process is to insure that the data is stored, so that the data may be deleted or overwritten at the host.

Referring to FIGS. 3 and 9, the data of a transaction to be synchronized is stored to a non-volatile store, and, upon storing all the data of the transaction to the non-volatile store, responds with a Command Complete, indicating that the data is safely stored and may be recovered in the event of a failure, so that the entity requesting the synchronization may overwrite the data. The data of the transaction is supplied to a magnetic tape drive for writing to the magnetic tape, but the synchronize command is stripped from the data. For example, in event 350, the data record 50 is provided to the tape drive for writing to the magnetic tape. As the result of stripping the synchronize command, the buffer of the tape drive is not emptied, and, if the data does not exceed the buffer threshold which causes writing to begin, may not begin writing and thus emptying the buffer. The storing, responding, and supplying operations are repeated for subsequent transactions of the data to be synchronized in events 351, 352 and 353. The data may comprise records 51, 52 and 53.

Subsequently, in a new function, a Deferred Synchronize Command is provided to the magnetic tape drive, the Deferred Synchronize Command specifying at least one previously supplied transaction of data. The Deferred Synchronize Command comprises a Command for writing data of an identified transaction to magnetic tape. This is not a typical synchronize command. Rather, the command relates to a specified transaction of data that had been previously supplied and stored in the tape drive buffer. The data may have already been written to the magnetic tape. As an example, the Deferred Synchronize Command of event 354 specifies the transaction of record 51, which was provided to the magnetic tape drive at event 351, instead of 353 as would a regular synchronize. Thus, the magnetic tape drive writes the data (records 50, 51, 52, 53, etc.) in a continuous fashion, and, subsequent to writing all the data of the previously supplied transaction to magnetic tape (record 51), provides a Tape Command Complete, whereupon the data of the previously supplied transaction stored to the non-volatile store may be overwritten. At this point, most of the transaction 352 and all of 353 may be in buffer.

In the example, the Deferred Synchronize Command, in specifying at least the previously supplied transaction of data of event 351, is such that the magnetic tape drive provides a Tape Command Complete subsequent to writing all the data of the specified previously supplied transaction 351 to the magnetic tape (record 51), and also subsequent to writing data of transactions prior to the specified previously supplied transaction to the magnetic tape. In the example, the prior transaction was provided in event 350 and comprises record 50. Thus, the Tape Command Complete allows the data (record 51) of the specified previously supplied transaction (event 351), and the data (record 50) of transactions (event 350) prior to the specified previously supplied transaction, to be overwritten at the non-volatile store.

The process continues in this fashion, with the Deferred Synchronize Command specifying at least the previously supplied transaction of data, such that the magnetic tape drive provides a Tape Command Complete subsequent to writing all the data of the specified previously supplied transaction to the magnetic tape, and also subsequent to writing data to tape of transactions prior to the specified previously supplied transaction. When the last of the data to be synchronized has been supplied to the tape drive, such as event 360, a final Deferred Synchronize Command is provided in event 362.

In this manner, all of the data to be synchronized is stored to a non-volatile store to insure that it is preserved, and is written to the magnetic tape in a continuous manner without necessarily forcing a backhitch, and when written to the magnetic tape for final preservation, the data may be overwritten at the non-volatile store.

Herein, the term "at least one specified transaction", or similar terminology, relating to a Deferred Synchronize Command, also includes the possibility of only a part of a transaction. This is in case the issued Deferred Synchronize Commands do not align with the transaction boundaries. For example, if A, B, and C are each transactions of 100 records, but after C, a Deferred Synchronize Command may be issued for all data before that was sent 150 records ago, which is in the middle of transaction B, not at the end of it.

Referring to FIG. 2, a recording system is illustrated in accordance with an embodiment of the present invention for writing synchronized data to magnetic tape 11. As an example, the magnetic tape may be in the form of a removable magnetic tape cartridge, and the cartridge may comprise a length of tape wound on a single reel, or on dual reels. A tape drive 15 provides a means for reading and writing information with respect to the magnetic tape 11. A cartridge and associated tape drive are illustrated, such as those adhering to the Linear Tape Open (LTO) format. An example of a single reel tape drive is the IBM 3580 Ultrium magnetic tape drive based on LTO technology. Another example of a single reel tape drive is the IBM 3590 Magstar magnetic tape drive and associated magnetic tape cartridge. An example of a dual reel cartridge is the IBM 3570 magnetic tape cartridge and associated drive.

As is understood by those of skill in the art, a recording system operates the tape drive in accordance with commands received from a host system 20 received at an interface bus 21. The tape drive may comprise a standalone unit or comprise a part of a tape library or other subsystem. The tape drive 15 may be coupled to the host system 20 directly, through a library, or over a network, and employ the Small Computer Systems Interface (SCSI), Fibre Channel Interface, etc.

The magnetic tape drive 15 buffers the data in a buffer 16, and writes data to magnetic tape. The magnetic tape drive responds to a Deferred Synchronize Command for writing data of an identified transaction to magnetic tape, with a Tape Command Complete subsequent to writing all data of the identified transaction to magnetic tape. A Deferred Synchronize Command, by specifying at least one previously supplied record or transaction of data, comprises a Command for writing data of an identified transaction to magnetic tape. Thus, the magnetic tape drive provides the Tape Command Complete subsequent to writing all the data of the previously supplied transaction to the magnetic tape. Further, if data of transactions prior to the specified previously supplied transaction are in the buffer 16, the magnetic tape drive writes both the data of transactions prior to the specified previously supplied transaction, and the data of the specified previously supplied transaction to the magnetic tape.

A non-volatile store 25 is provided for storing data, and may be of limited capacity. In one embodiment, the non-volatile store 25 may be removable in case of failure of the recording system and inserted in another recording system for recovery of the data. The removable non-volatile store may comprise a removable hard disk drive, or, alternatively comprise an electronic memory. Still alternatively, the non-volatile store may not be removable, but the data may be transmittable to another recording system for recovery of the data.

Examples of a removable non-volatile store 25 are discussed in copending and coassigned U.S. patent application Ser. No. 09/842,030, filed Apr. 26, 2001. Examples include a removable hard disk drive and a removable non-volatile solid state memory.

Another example is a high speed emergency copy, where the data is actually in volatile memory, but a power providing circuit senses if power is lost and, if so, forces a high speed emergency copy to occur to flash memory, a disk drive, or another form of involatile memory, immediately. The power for this to occur (e.g. 10-20 seconds) is provided by battery backup. Thus, the data is not really in involatile memory, but it is somewhere that it can be copied to involatile memory in response to a power loss condition if necessary via backup power. Hereafter, a high speed emergency copy to non-volatile store will be logically grouped as a sub-set of non-volatile store, and not separately called out.

In one embodiment, deferred sync logic 80 is provided for communicating with the magnetic tape drive 15 and for communicating with the non-volatile store 25 for writing data to be synchronized to magnetic tape, the data to be synchronized in the form of transactions.

In the embodiment of FIG. 2, the deferred sync logic 80 comprises a separate component, or, alternatively, comprises part of the host system. The deferred sync logic 80 receives the data to be synchronized, which could be in the form of a transaction and a Synchronize Command following the transaction, and stores the data of the transaction to the non-volatile store 25. In one embodiment, the deferred sync logic 80 confirms that the received data of the Synchronize Command is stored to the removable hard disk drive 25; and responds to the supplier of the data to be synchronized Command with a Command Complete. The deferred sync logic 80 also supplies the data of the transaction to the magnetic tape drive 15 for writing to the magnetic tape 11. As the result, the transaction may be erased from the host system with the assurance that the transaction has been stored at the non-volatile store 25 and will not be lost, for example, as the result of a power loss. The deferred sync logic 80 repeats the store, respond and supply operations for subsequent data of transactions to be synchronized.

In one embodiment, upon storing a predetermined quantity of the data of the transactions to the non-volatile store 25, the deferred sync logic 80 provides a Deferred Synchronize Command to the magnetic tape drive 15. The Deferred Synchronize Command specifies at least one previously supplied transaction of data, the Deferred Synchronize Command comprising the Command for writing data of an identified transaction to tape, such that the magnetic tape drive 15, subsequent to writing all the data of the specified previously supplied transaction from the buffer 16 to the magnetic tape 11, and writing data of transactions prior to the specified previously supplied transaction to the magnetic tape 11, provides a Tape Command Complete. Thus, the data of the specified previously supplied transaction, and the data of transactions prior to the specified previously supplied transaction, may be overwritten at the non-volatile store 25.

The tape drive 15 thus writes the synchronized data to the magnetic tape in a continuous manner, as illustrated in FIG. 3, without necessarily forcing a backhitch as did the prior art of FIG. 1.

Referring to FIG. 2, the logic for operating the magnetic tape drive 15 to respond to the Command for writing data of an identified transaction to tape, and subsequent to writing all the data of the identified transaction from the buffer 16 to the magnetic tape 11, and writing data of transactions prior to the specified previously supplied transaction to the magnetic tape 11, to provide a Tape Command Complete, may comprise tape drive logic 17 resident in the magnetic tape drive 15, tape drive logic forming a part of the deferred sync logic 80, or may comprise a separate logic component. Hence, herein, reference to the tape drive logic for operating the magnetic tape drive, or reference to the operation of the magnetic tape drive, are defined as the same, and the logic for operating the magnetic tape drive may be resident in the magnetic tape drive or may be outside the magnetic tape drive.

In FIG. 3, the data of each transaction is accumulated in the buffer 16 of the tape drive 15 of FIG. 2, and is not considered synchronized data at the tape drive since no Synchronize Command accompanies the data. The tape drive writes the transactions of data to be synchronized from the buffer to the magnetic tape in a continuous manner, e.g., illustrated as data sets 100, 101, and following the preceding data 99. It is possible that writing the initial data set may comprise a backhitch to place the written data following the preceding data 99 with a nominal gap.

The deferred sync logic 80 of FIG. 2 writes the data to the magnetic tape from the tape buffer in a continuous fashion and new data may be supplied to the buffer as the data is written to the magnetic tape.

Hence, in FIG. 3, the synchronized transactions 50-53 have been immediately written to the non-volatile store 25 of FIG. 2, and preserved against a power loss, while also being accumulated for the magnetic tape drive, e.g., at a buffer of the tape drive, and then written to follow the preceding data 99 in data sets 100,101. Once the transactions have been written to the magnetic tape 11, the tape buffer may be overwritten.

Referring to FIG. 2, should an error occur before the Deferred Synchronize Command is issued, such that the data may not have been totally written to the magnetic tape 11 by magnetic tape drive 15, the data is retrievable from the non-volatile store 25. If the error is the result of a permanent failure of the recording system such that it may need to be replaced, the non-volatile store 25 may be removed and placed into another recording system for recovery of the data.

In still another embodiment, the non-volatile store comprises at least two partitions for storing data, and the stored predetermined quantity of data of the transactions comprises data stored to one of the partitions of the non-volatile store. Referring to FIG. 2, the non-volatile store 25 comprises at least two partitions 121 and 122 for storing data. Either partition 121 or 122 may be called "one" partition and the other called "another" partition. In this embodiment, the stored predetermined quantity of data to be synchronized comprises data stored to one partition, e.g., partition 121, of the non-volatile store.

The deferred sync logic 80, in storing the predetermined quantity of data to be synchronized to the one partition 121 of the non-volatile store 25, provides the Deferred Synchronize Command to the magnetic tape drive 15 to insure that the data of the another partition 122 may be overwritten. This is accomplished by specifying, in the Deferred Synchronize Command, data of the last transaction stored in, or the transaction which spans out of, the another partition, e.g., partition 122. Upon the Tape Command Complete indicating that the data of the specified transaction has been written to magnetic tape, the data of the specified transaction in the another partition of the non-volatile store may be overwritten. Thus, the deferred sync logic 80 stores later data of a transaction to be synchronized to the another partition 122 of the non-volatile store; and repeats the respond and supply operations for the later transaction.

Additionally, in another embodiment, the deferred sync logic 80, upon failure of the storing operation to the non-volatile store 25, provides a Synchronize Command to the magnetic tape drive 15 to preserve the data on magnetic tape.

Figure 4:
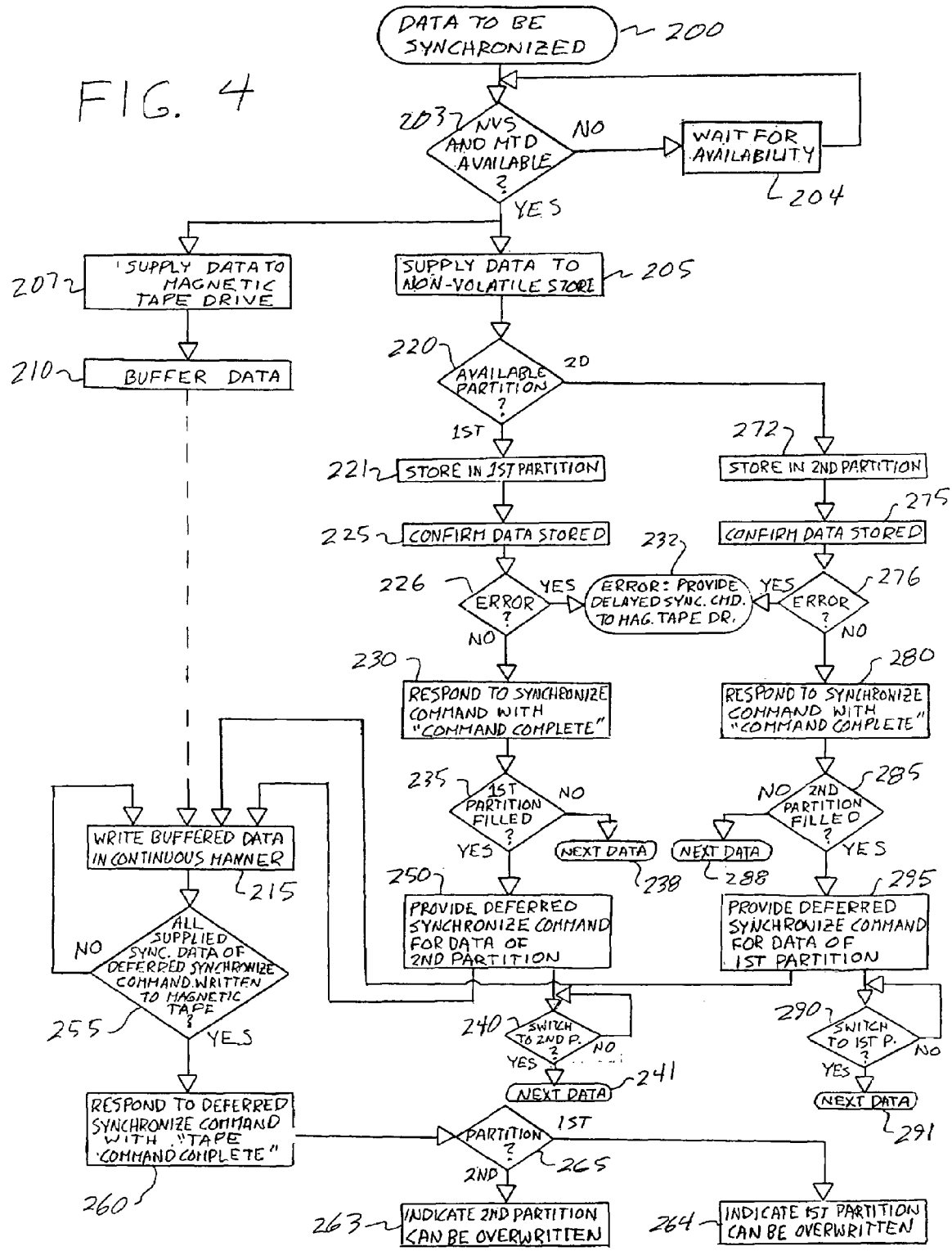
FIG. 4 is a flow chart depicting an embodiment of the method of the present invention for writing data to be synchronized to magnetic tape.

FIG. 4 comprises an embodiment of the method in accordance with the present invention. Referring to FIGS. 2 and 4, data to be synchronized is received, e.g., from host 20, in step 200. In order to prevent an overrun of the magnetic tape drive buffer 17, or of the non-volatile store 25, the deferred sync logic 80 determines in step 203 whether sufficient storage space is available for the data of the transaction in both the magnetic tape drive buffer and the non-volatile store. If not, the transaction is throttled by a wait step 204.

If space is available, the data is supplied to the non-volatile store 25 in step 205. The data, but not the Synchronize Command, of the transaction is also supplied to the magnetic tape drive 15 in step 207, and may be essentially in parallel. Without a Synchronize Command, the tape drive may buffer the data in step 210. Thus, the tape drive 15 may write the data in a continuous manner on magnetic tape 11 in step 215, and not have to backhitch to store the data immediately, as it would if the data were provided with a Synchronize Command, as discussed above.

From step 205, in another embodiment of the present invention, the non-volatile store is provided with at least two partitions. Step 220 determines which partition of the non-volatile store 25 is available. If, e.g., both partitions 121 and 122 are available, a default selection may be made. The partitions are referred to as "one" partition and "another" partition. For the purpose of FIG. 4, the partitions are instead referred to as a "first (1st)" partition and a "second (2nd)" partition; and either the first partition or the second partition may comprise the "one" partition, and may comprise the "other" partition, and will swap. If the first partition is available and is selected in step 220, the data of the synchronized transaction is stored in the first partition 121 of non-volatile store 25 in step 221. The operation of the non-volatile store typically comprises confirmation that the data is stored, and is illustrated as step 225. As an example, a hard disk drive provides "good status" if the data is actually stored on the disk, comprising a confirmation in step 225 that the data of the transaction is stored to the non-volatile store 25, satisfying step 226. Upon confirmation, the deferred sync logic 80 responds, in step 230, with a Command Complete, e.g., to the host which issued the write command. As the result, the transaction may be erased from the host system 20 with the assurance that the transaction has been written and will not be lost as the result of a power loss.

If step 225 fails, such that step 226 indicates that there is no assurance that the data of the transaction has been stored to the non-volatile store 25, step 232 indicates an error condition and provides a Synchronize Command to the magnetic tape drive 15. In one example, a normal Synchronize Command is provided, rather than a Deferred Synchronize Command. In that event, all the data at the magnetic tape drive at step 215 is written to the magnetic tape 11. The data can then be recovered either by the magnetic tape drive 15, or the magnetic tape may be moved to another magnetic tape drive. Further, the Command Complete of step 230 is not provided to the host by the non-volatile store, and the data remains active at the host system until the magnetic tape drive issues the Tape Command Complete, which is passed to the host by the deferred sync logic as the Command Complete of the synchronizing command.

Step 235 determines whether the data of the transaction just stored to the non-volatile store 25 in step 221 comprises the predetermined quantity, or in the alternative embodiment of partitions, step 235 determines whether the data has filled, or will fill, one partition, e.g., the first partition. If not, in either case, there is more space for the next transaction, and the process returns in step 238 for the next transaction. The deferred sync logic 80 repeats the store, confirm, respond and supply operations for subsequent transactions of data to be synchronized.

The deferred sync logic 80 additionally, if, in storing the predetermined quantity of data for the later transactions to the one partition of the non-volatile store, in step 235, determines that the first partition 121 is filled, or will be filled, then, in step 250, provides a Deferred Synchronize Command to the magnetic tape drive 15. The Deferred Synchronize Command specifies that the magnetic tape drive should not respond until all of the data of the another partition, here, the second partition, is written to tape.

The magnetic tape drive has been writing data to the magnetic tape in a continuous manner in step 215. None, some, or all of the data referred to by the Deferred Synchronize Command may have been written to the magnetic tape prior to the Deferred Synchronize Command being received and responded to. Even when all of the data referred to by the Deferred Synchronize Command has been written, there is still data in the tape buffer corresponding to records or transactions received after the referred to one was, allowing the tape drive to continue writing this further data to magnetic tape as illustrated in FIG. 3, without necessarily forcing a backhitch as did the prior art of FIG. 1. Step 255 determines whether all of the data referred to by the Deferred Synchronized Command has been written to magnetic tape 11, and, if not, waits until the writing process in step 215 has passed this milestone. Then, with all the data referred to by the Deferred Synchronize Command written to magnetic tape, as determined by step 255, the magnetic tape drive responds to the Deferred Synchronize Command with the Tape Command Complete in step 260. As the result, the predetermined quantity of synchronized data has been written to magnetic tape.

With respect to the partitions, the tape drive logic responds to the Deferred Synchronize Command, in step 255, determining whether all the data of the specified previously supplied transaction of the another partition has been written to the magnetic tape 11, and whether the data of transactions prior to the specified previously supplied transaction have been written to magnetic tape. If not, the process continues at step 215 to write the data to the magnetic tape.

Upon step 255 indicating that all the data of the specified previously supplied transaction of the another partition, and data of transactions prior to the specified previously supplied transaction have been written to the magnetic tape, a Tape Command Complete is provided in step 260 to the deferred sync logic as the drive continues to write subsequent data. Hence, the data of the specified previously supplied transaction of the another partition, and the data of transactions prior to the specified previously supplied transaction, may be overwritten at the another partition of the non-volatile store.

Upon writing the predetermined quantity of data to be synchronized to magnetic tape, and providing the Tape Command Complete, the deferred sync logic 80 indicates that the predetermined quantity of data may be overwritten in step 263 or in step 264. In the embodiment of a plurality of partitions, step 265 determines which partition provided the data, and makes the indication of step 263 or step 264 based on that determination.

Thus, the magnetic tape drive, subsequent to writing all the data of the specified previously supplied transaction of the another partition to the magnetic tape, and writing data of transactions prior to the specified previously supplied transaction to said magnetic tape, provides a Tape Command Complete. Hence, the data of the specified previously supplied transaction of the another partition, and the data of transactions prior to the specified previously supplied transaction, may be overwritten at the another partition of said non-volatile store, and the deferred sync logic conducts the storing, responding and supplying operations for said data of later transactions, with respect to the another partition of the non-volatile store.

In the example of the Deferred Synchronize Command specifying data of a transaction of the second partition, and an indication at step 263 that the Tape Command Complete refers to that specified data, step 240 switches to the second partition 122 for subsequent data, and returns in step 241 for the next transaction.

If step 240 resulted in a switch to the second partition, and that partition is available, after return step 241, for data of later transactions, step 220 proceeds to step 272 to store the data of the next synchronized transaction to the second partition 122 of the non-volatile store 25.

From step 203, the data, but not the Synchronize Command, of the transaction was also supplied to the magnetic tape drive 15 in step 207. Without a Synchronize Command, the tape drive may buffer the data in step 210. Thus, as before, the tape drive 15 may write the data in a continuous manner on magnetic tape 11 in step 215, and not have to backhitch to store the data immediately, as it would if the data were provided with a Synchronize Command.

From step 205, in the partitioned embodiment of the present invention, step 220 determines which partition of the non-volatile store 25 is available. If, because of step 240, the second partition 122 is available, it is selected in step 220, and the data of the synchronized transaction is stored in the second partition 122 of non-volatile store 25 in step 272. The operation of the non-volatile store provides a confirmation of step 275 that the data of the later transaction is stored to the non-volatile store 25, satisfying step 276. In that case, the deferred sync logic 80 responds, in step 280, with a Command Complete. As the result, the transaction may be erased from the host system 20 with the assurance that the transaction has been written and will not be lost as the result of a power loss.

If step 275 fails, such that step 276 indicates that there is no assurance that the data of the transaction has been stored to the non-volatile store 25, step 232 indicates an error condition and provides the Synchronize Command to the magnetic tape drive 15. In that event, all the data at the magnetic tape drive at step 215 is written to the magnetic tape 11. The data can then be recovered either by the magnetic tape drive 15, or the magnetic tape may be moved to another magnetic tape drive. Further, the Command Complete of step 280 is not provided, and the data remains active at the host system until the magnetic tape drive issues the Tape Command Complete, which is passed to the host by the deferred sync logic as the Command Complete of the synchronizing command.

Step 285 determines whether the data of the transaction just stored to the non-volatile store 25 in step 221 comprises a predetermined quantity of data, or in the alternative embodiment of partitions, step 285 determines whether the data has filled, or will fill, one partition, e.g., the second partition. If not, in either case, there is more space, and the process returns in step 288 for the next transaction. The deferred sync logic 80 repeats the store, confirm, respond and supply operations for subsequently data to be synchronized transactions.

The deferred sync logic 80 additionally, if, in storing the predetermined quantity of data for the later transactions to the one partition of the non-volatile store, in step 285, determines that the second partition 122 is filled, or will be filled, then, in step 295, provides a Deferred Synchronize Command to the magnetic tape drive 15. The Deferred Synchronize Command specifies data of the another partition, here, the first partition.

The magnetic tape drive has been writing data to the magnetic tape in a continuous manner in step 215. Again, none, some, or all of the data may have been written to the magnetic tape prior to the Deferred Synchronize Command being received and responded to. If all of the data referenced by the Deferred Synchronize Command has already been written to tape, a Tape Command Complete may be returned almost immediately without interrupting any on-going write of the data subsequent to that returned by the Deferred Synchronize Command. The tape drive thus continues to write the synchronized data to the magnetic tape in a continuous manner, as illustrated in FIG. 3, without backhitching as in the prior art of FIG. 1. Step 255 determines whether all of the data has been written to magnetic tape 11, and, if not, the writing process continues in step 215.

Upon all the data of the Deferred Synchronize Command written to magnetic tape, as determined by step 255, the magnetic tape drive responds to the Deferred Synchronize Command with the Tape Command Complete in step 260. As the result, the predetermined quantity of synchronized data has been written to magnetic tape.

With respect to the partitions, the tape drive logic responds to the Deferred Synchronize Command, in step 255, determining whether all the data of the specified previously supplied transaction of the another partition, partition 121, has been written to the magnetic tape 11, and whether the data of transactions prior to the specified previously supplied transaction have been written to magnetic tape. If not, the process continues at step 215 to write the data to the magnetic tape.

Upon step 255 indicating that all the data of the specified previously supplied transaction of the another partition, and data of transactions prior to the specified previously supplied transaction have been written to the magnetic tape, a Tape Command Complete is provided in step 260. Hence, the data of the specified previously supplied transaction of the another partition, and the data of transactions prior to the specified previously supplied transaction, may be overwritten at the another partition of the non-volatile store, here, the first partition 121.

Upon writing the predetermined quantity of data to be synchronized to magnetic tape, and providing the Tape Command Complete, the deferred sync logic 80 indicates that the predetermined quantity of data may be overwritten in step 263 or in step 264. In the embodiment of a plurality of partitions, step 265 determines which partition provided the data, and makes the indication of step 263 or step 264 based on that determination.

Again, the magnetic tape drive, subsequent to writing all the data of the specified previously supplied transaction of the another partition to the magnetic tape, and writing data of transactions prior to the specified previously supplied transaction to said magnetic tape, provides a Tape Command Complete. Hence, the data of the specified previously supplied transaction of the another partition, and the data of transactions prior to the specified previously supplied transaction, may be overwritten at the another partition of said non-volatile store, and the deferred sync logic conducts the storing, responding and supplying operations for said data of later transactions, with respect to the another partition of the non-volatile store.

In the example of the Deferred Synchronize Command specifying data of a transaction of the second partition, and an indication at step 264 that the Tape Command Complete refers to that specified data, step 290 switches to the first partition 121 for subsequent data, and returns in step 291 for the next transaction.

If step 290 resulted in a switch to the second partition, and that partition is available, after return step 291, for data of later transactions, step 220 proceeds to step 221 to store the data of the next synchronized transaction to the first partition 121 of the non-volatile store 25.

Those of skill in the art understand that changes may be made in accordance with specific formats in which the invention may be implemented, and in accordance with alternative ordering of the steps of FIG. 4.

Further, those of skill in the art understand that various recording systems, logic, non-volatile stores, magnetic tape drives, and tape cartridges may be employed, having differing specific component arrangements.

Figure 5:
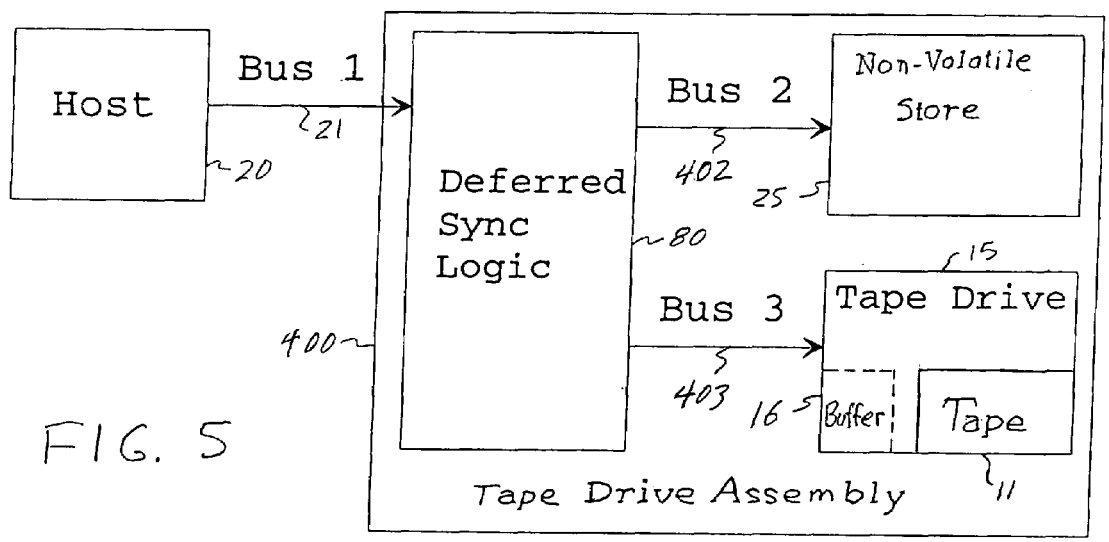
FIG. 5 is a block diagram of an alternative embodiment of the present invention for writing data to be synchronized to magnetic tape.
Figure 6:
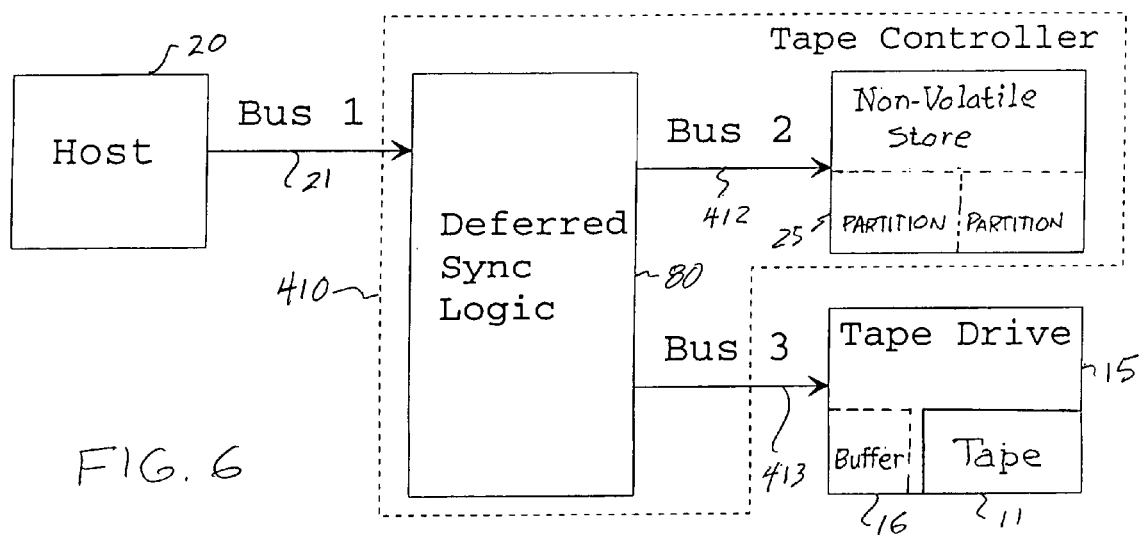
FIG. 6 is a block diagram of a further alternative embodiment of the present invention for writing data to be synchronized to magnetic tape.
Figure 7:
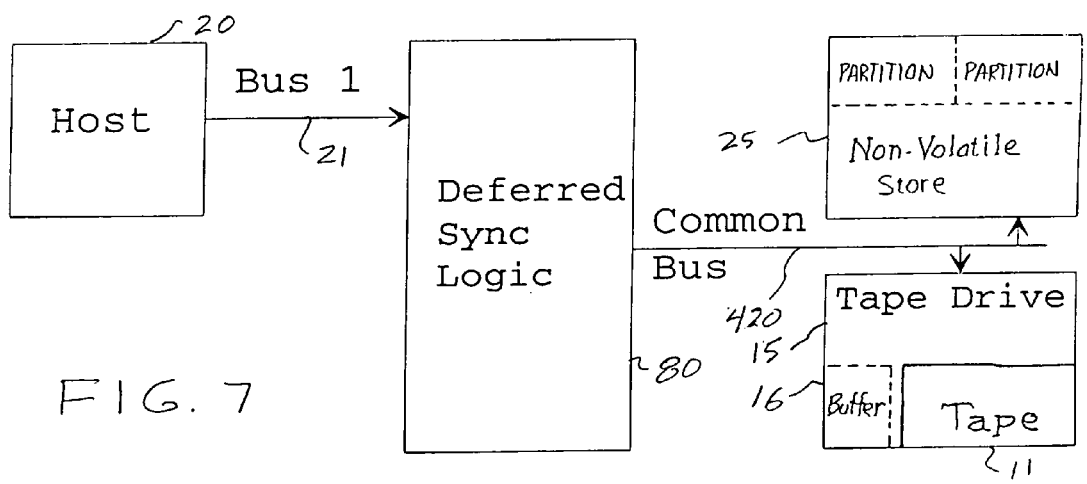
FIG. 7 is a block diagram of a still further alternative embodiment of the present invention for writing data to be synchronized to magnetic tape.

FIGS. 5, 6 and 7 represent examples of some of the alternative arrangements.

In FIG. 5, the recording system of the present invention is embodied in a tape drive assembly 400, of which the deferred sync logic 80, the non-volatile store 25, and the magnetic tape drive 15 are components. The deferred sync logic 80 communicates with the host at bus 21, with the non-volatile store 25 at bus 402, and with the magnetic tape drive 15 at bus 403.

In FIG. 6, the recording system of the present invention is embodied in a tape controller 410, with the magnetic tape drive 15 communicating with the tape controller at bus 413. In this case, the tape drive is a standard tape drive with the extension that it supports the Deferred Synchronize Command. The deferred sync logic 80 and the non-volatile store 25 are components of the tape controller 310. The deferred sync logic 80 communicates with the host at bus 21, and with the non-volatile store 25 at bus 412.

In FIG. 7, the recording system of the present invention is embodied in separate components, but with the deferred sync logic 80 communicating with the non-volatile store 25 and the magnetic tape drive 15 at a common bus 420. The deferred sync logic 80 communicates with the host at bus 21.

Figure 10:
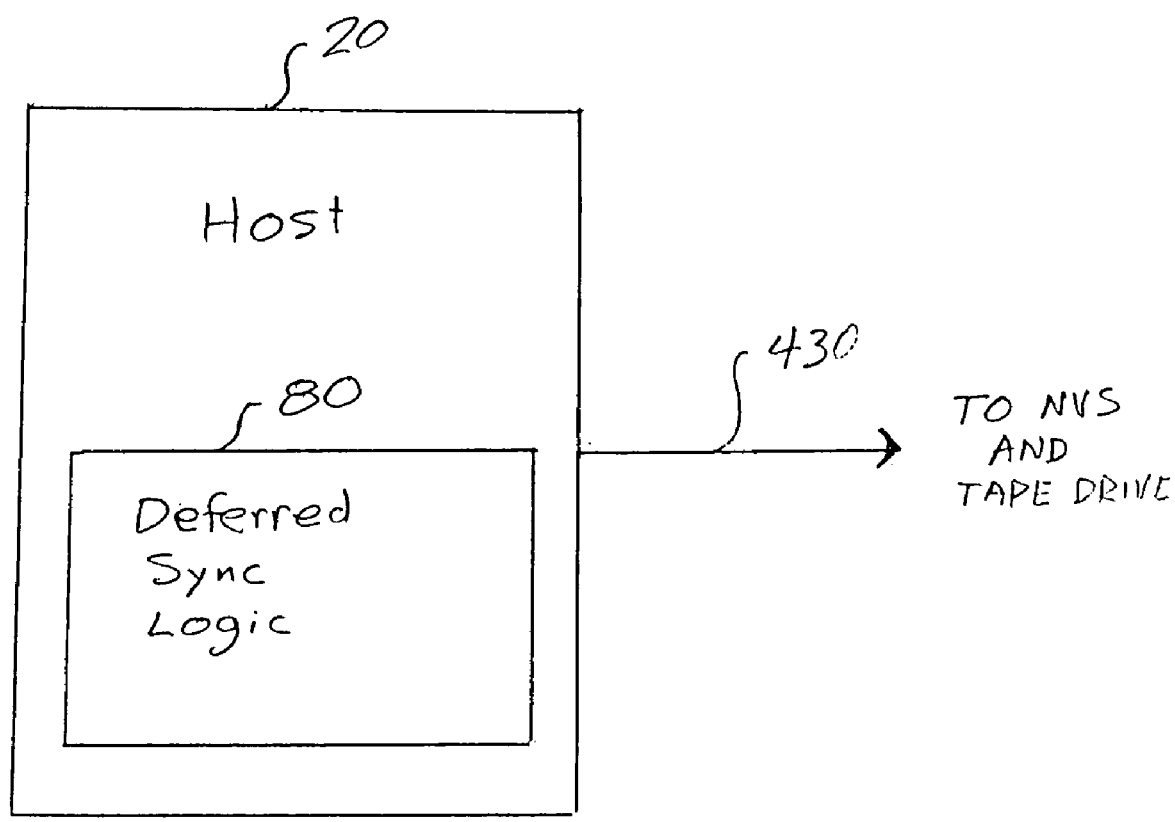
FIG. 10 is a block diagram of another alternative embodiment of the present invention for writing data to be synchronized to magnetic tape.

In FIG. 10, the deferred sync logic 80 is embedded into the host application of host 20, such that the host application issues a command stream on bus(es) 430 that is similar to that depicted in FIG. 9. In this case, the deferred sync logic comprises a computer program product. Other depicted embodiments may also comprise computer program products. In the embodiment of FIG. 10, the host application delays dumping or overwrite of data until the Deferred Synchronize Command associated with that data indicates that it is on tape via a Tape Command Complete. Referring to FIG. 9, as an example, the host application does not allow the data in Record B (351) to be dumped or overwritten until the Tape Command Complete is received in response to the Deferred Synchronize Command of B (354). This allows for minimal hardware changes to systems, and is thus optimal in those cases where change to the host application is acceptable but the systems are essentially fixed. The computer program product may comprise the same, or a different, computer readable medium as the host application, as is known to those of skill in the art.

Those of skill in the art may envision further arrangements of the deferred sync logic 80, non-volatile store 25 (with or without partitions), and magnetic tape drive 15, with the tape buffer 16 for writing on a magnetic tape 11, and of the tape drive logic, discussed above.

Herein, no sequentiality is implied by listing the step of supplying the data of the transaction to the magnetic tape drive subsequent to the steps of storing the data of the transaction to the non-volatile store, nor subsequent to the Command Complete response. Preferably, but not necessarily, the steps of supplying the data of the transaction to the magnetic tape drive and of storing the data of the transaction to the non-volatile store, occur in parallel.

While the preferred embodiments of the present invention have been illustrated in detail, it should be apparent that modifications and adaptations to those embodiments may occur to one skilled in the art without departing from the scope of the present invention as set forth in the following claims.

I claim:

1. A magnetic tape drive assembly configured to write data to magnetic tape, said data in the form of at least one transaction of data with a synchronize command to synchronize said transaction, said data to be synchronized, comprising:

a magnetic tape drive configured to write writing data to magnetic tape;

a buffer configured to store said transactions of data for writing data to magnetic tape;

deferred sync logic configured to communicate with a non-volatile store, said non-volatile store for storing data, said deferred sync logic configured to perform the operations of:

storing said data of a transaction to be synchronized to said non-volatile store;

upon storing all said data of said transaction to said non-volatile store, responding with a Command Complete;

supplying said data of said transaction to said buffer for writing to said magnetic tape;

repeating said storing, responding, and supplying operations for subsequent transactions of said data to be synchronized; and providing a Deferred Synchronize Command specifying at least one previously supplied said transaction of data, said Deferred Synchronize Command comprising a command for writing data of an identified transaction to magnetic tape; and tape drive logic configured to respond to a Deferred Synchronize Command identifying a transaction previously supplied to said buffer, said tape drive logic configured to perform the operations of:

operating said magnetic tape drive to write all data of said identified previously supplied transaction of said buffer to said magnetic tape, and to write data of any transactions of said buffer received prior to said identified previously supplied transaction of said buffer to said magnetic tape; and providing a Tape Command Complete subsequent to operating said magnetic tape drive to write all data of said identified previously supplied transaction to said magnetic tape and to write data of any said transactions received prior to said identified previously supplied transaction to said magnetic tape, whereupon said data of said previously supplied transaction stored to said non-volatile store may be overwritten.

2. The magnetic tape drive assembly of claim 1, wherein said deferred sync logic is configured to, in conducting said operation of supplying said data of said transaction to said buffer, to strip said synchronize command from said transaction.

3. A method for writing data to magnetic tape, said data in the form of at least one transaction of data with a synchronize command to synchronize said transaction, said data to be synchronized, said method comprising the steps of:

storing said data of a transaction to be synchronized to a non-volatile store;

upon storing all said data of said transaction to said non-volatile store, responding with a Command Complete;

supplying said data of said transaction to a buffer for writing to a magnetic tape;

repeating said storing, responding, and supplying operations for subsequent transactions of said data to be synchronized;

in response to a Deferred Synchronize Command identifying a transaction previously supplied to said buffer, operating a magnetic tape drive to write all data of said identified previously supplied transaction of said buffer to said magnetic tape, and to write data of any transactions of said buffer received prior to said identified previously supplied transaction of said buffer to said magnetic tape; and providing a Tape Command Complete subsequent to operating said magnetic tape drive to write all data of said identified previously supplied transaction to said magnetic tape and to write data of any said transactions received prior to said identified previously supplied transaction to said magnetic tape, whereupon said data of said previously supplied transaction stored to said non-volatile store may be overwritten.

4. The method of claim 3, wherein said step of supplying said data of said transaction to said buffer, comprises stripping said synchronize command from said transaction.

5. A computer program product of a computer readable medium usable with at least one programmable computer, said computer program product having computer readable program code embodied therein for writing data to magnetic tape, said data in the form of at least one transaction of data with a synchronize command to synchronize said transaction, said data to be synchronized, comprising:

computer readable program code which causes at least one computer processor to store said data of a transaction to be synchronized to a non-volatile store;

computer readable program code which causes at least one computer processor to, upon storing all said data of said transaction to said non-volatile store, respond with a Command Complete;

computer readable program code which causes at least one computer processor to supply said data of said transaction to a buffer for writing to a magnetic tape;

computer readable program code which causes at least one computer processor to repeat said storing, responding, and supplying operations for subsequent transactions of said data to be synchronized;

computer readable program code which causes at least one computer processor to, in response to a Deferred Synchronize Command identifying a transaction previously supplied to said buffer, operate a magnetic tape drive to write all data of said identified previously supplied transaction of said buffer to said magnetic tape, and to write data of any transactions of said buffer received prior to said identified previously supplied transaction of said buffer to said magnetic tape; and computer readable program code which causes at least one computer processor to provide a Tape Command Complete subsequent to operating said magnetic tape drive to write all data of said identified previously supplied transaction to said magnetic tape and to write data of any said transactions received prior to said identified previously supplied transaction to said magnetic tape, whereupon said data of said previously supplied transaction stored to said non-volatile store may be overwritten.

6. The computer program product of claim 5, wherein said computer readable program code which causes at least one computer processor to supply said data of said transaction to a buffer, comprises computer readable program code which causes at least one computer processor to strip said synchronize command from said transaction.

* * * * *